United States Patent
Sinclair et al.

(10) Patent No.: US 10,031,257 B2
(45) Date of Patent: Jul. 24, 2018

(54) ENVIRONMENTAL MONITORING OF LOGGING-WHILE-DRILLING TOOL COMPONENTS

(71) Applicant: CBG Corporation, Austin, TX (US)

(72) Inventors: Paul L. Sinclair, Austin, TX (US); Thomas A. Springer, Austin, TX (US); Derek Crocker, Austin, TX (US)

(73) Assignee: CBG Corporation, Austin, TX (US)

( * ) Notice: Subject to any disclaimer, the term of this patent is extended or adjusted under 35 U.S.C. 154(b) by 238 days.

(21) Appl. No.: 14/802,141

(22) Filed: Jul. 17, 2015

(65) Prior Publication Data
US 2016/0025892 A1    Jan. 28, 2016

Related U.S. Application Data

(60) Provisional application No. 62/028,635, filed on Jul. 24, 2014.

(51) Int. Cl.
| | |
|---|---|
| *G01V 5/00* | (2006.01) |
| *G01V 5/04* | (2006.01) |
| *E21B 47/01* | (2012.01) |
| *E21B 47/06* | (2012.01) |

(52) U.S. Cl.
CPC ............ *G01V 5/045* (2013.01); *E21B 47/011* (2013.01); *E21B 47/065* (2013.01); *G01V 5/04* (2013.01)

(58) Field of Classification Search
CPC ........ G01V 5/04; G01V 5/045; E21B 47/017; E21B 47/06; E21B 47/011
USPC ...................................................... 250/254
See application file for complete search history.

(56) References Cited

U.S. PATENT DOCUMENTS

| | | | | |
|---|---|---|---|---|
| 5,021,494 A | * | 6/1991 | Toya | C08K 3/0033 524/404 |
| 5,145,143 A | * | 9/1992 | Jackson | B60G 7/02 248/609 |
| 5,931,000 A | * | 8/1999 | Turner | E21B 36/003 166/66 |
| 8,204,691 B2 | | 6/2012 | Deere | 702/9 |
| 8,510,052 B2 | | 8/2013 | Deere | 702/9 |
| 2003/0214879 A1 | * | 11/2003 | Proett | G01V 11/002 367/81 |
| 2004/0079526 A1 | * | 4/2004 | Cairns | E21B 44/00 166/255.2 |
| 2004/0257241 A1 | * | 12/2004 | Menger | E21B 47/01 340/854.3 |

(Continued)

OTHER PUBLICATIONS

CBG Corporation—Preliminary Product Announcement: "The CBG 'Smart'Gamma System", v 060114, 2 pages.

*Primary Examiner* — David Porta
*Assistant Examiner* — Meenakshi Sahu
(74) *Attorney, Agent, or Firm* — Campbell Stephenson LLP

(57) ABSTRACT

A method and system for environmental monitoring of logging-while-drilling (LWD) components. In one embodiment the system includes a formation sensor configured to generate a signal related to a property of a surrounding rock formation, and a first environmental sensor fastened to the formation sensor and configured to generate a signal related to a first environmental condition experienced by the first environmental sensor. The formation sensor and first environmental sensor may be contained in a package of an LWD tool.

16 Claims, 5 Drawing Sheets

(56) References Cited

U.S. PATENT DOCUMENTS

2011/0147083 A1\* 6/2011 Mauldin ................. E21B 44/00
                                                          175/50
2011/0266058 A1\* 11/2011 Kumar ................... E21B 10/08
                                                          175/57

\* cited by examiner

ENVIRONMENTAL MONITORING OF LOGGING-WHILE-DRILLING TOOL COMPONENTS

RELATED APPLICATIONS

This application claims the domestic benefit under Title 35 of the United States Code § 119(e) of U.S. Provisional Patent Application Ser. No. 62/028,635, entitled "Environmental Monitoring of Logging-While-Drilling Tool Components"; filed Jul. 24, 2014; and naming Paul L. Sinclair, Thomas A. Springer, and Derek M. Crocker as the inventors, which is hereby incorporated by reference in its entirety and for all purposes as if completely and fully set forth herein.

FIELD OF THE INVENTION

This invention relates to the field of logging-while-drilling (LWD), particularly during oil and gas development and exploration.

BACKGROUND

LWD tools, such as those used to take measurements and/or aid in geosteering while drilling for resources such as oil and gas, are exposed to very harsh environments. At the same time, many of the components within these LWD tools are inherently fragile. While LWD tools may be designed to protect fragile components as much as possible, the components may nevertheless fail or malfunction due to stresses encountered by the LWD tool during the drilling operation.

BRIEF DESCRIPTION OF THE DRAWINGS

A more complete understanding of the present invention may be acquired by referring to the following description and the accompanying drawings, in which like reference numbers indicate like features.

Figure 1:
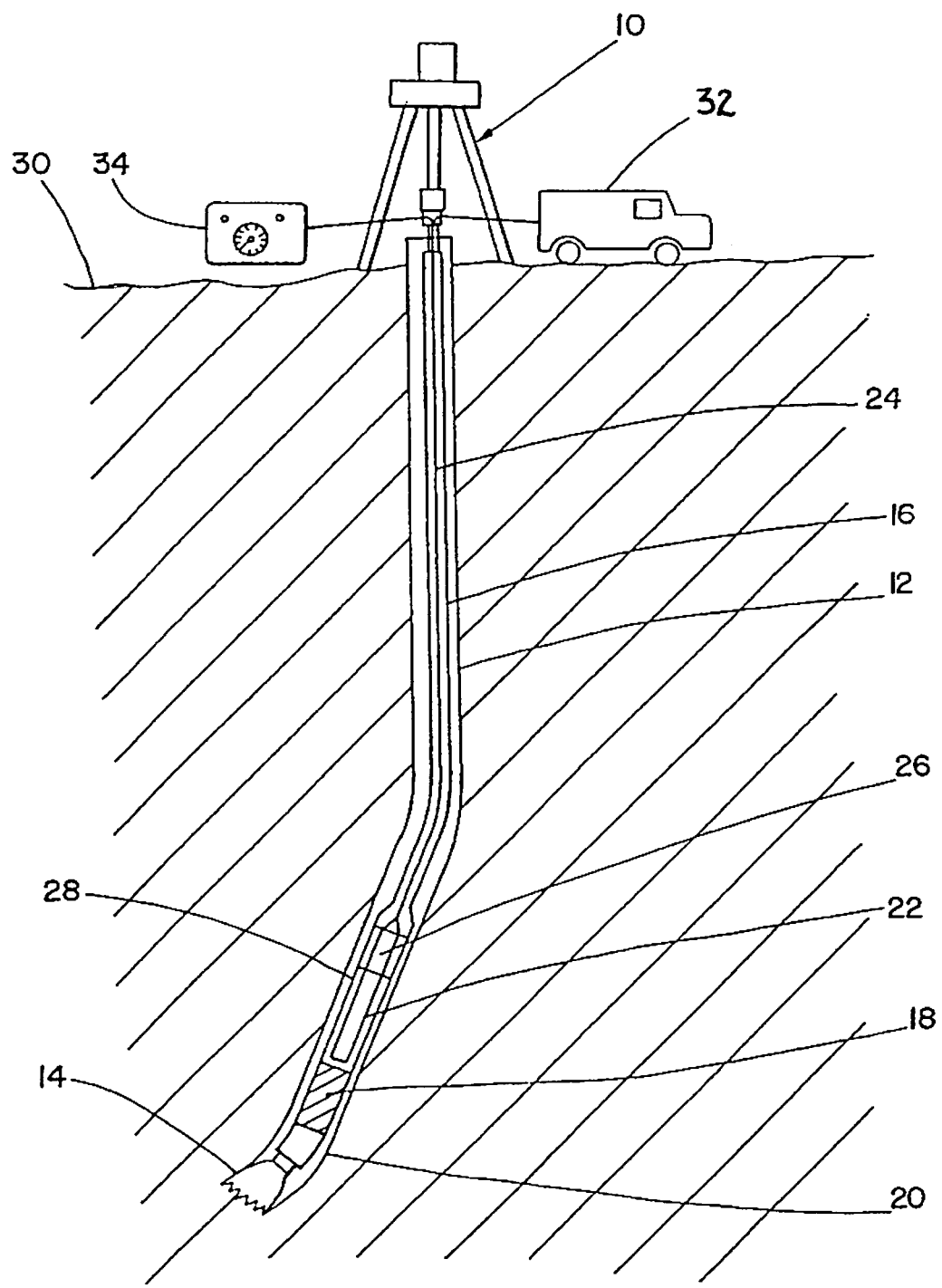
FIG. 1 illustrates a system used to drill a borehole, which includes a LWD tool that includes dedicated environmental sensors, according to one embodiment of the invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates how a drilling operation employs drilling rig 10 to cut a borehole 12 into the earth, penetrating the subsurface geological formation. Drillstring 16 passes through borehole 12 and is coupled to drilling rig 10. Drillstring 16 includes drill bit 14, drill collars 28, and drill pipe.

The lowest part of drillstring 16 is made up of drill collars 28 and drill bit 14. Drill collars 28 are heavy walled pipe that provide weight on drill bit 14 and strength to resist buckling under their own weight. The drill pipe is thinner walled. The drill pipe is kept in tension (which may be effected by collars 28 placing weight on drill bit 14) to prevent buckling. Drill collars 28 may have radial projections (not shown) called stabilizers. Short drill collars, which may be adapted for specialized functions, are called "subs," and references herein to drill collars are intended to include subs.

Drilling rig 10 can turn drill bit 14, which cuts through the rock at the bottom of borehole 12. In some situations, drilling rig 10 turns drill bit 14 by attaching drill bit 14 at the lower end of drillstring 16 and turning drillstring 16 with powered equipment at the surface. Alternatively, as shown in FIG. 1, drill bit 14 may be driven by a motor 18, which is adjacent to drill bit 14 in borehole 12, through bent sub 20. The illustrated arrangement is known as a "steering tool" system, in which drillstring 16 does not need to rotate to turn the drill bit. However, drillstring 16 can be turned to steer drill bit 14, so as to control the direction of advance of borehole 12, thus permitting the route of borehole 12 to be precisely steered as desired through the subsurface geologic formation.

A logging-while-drilling (LWD) tool 22 is placed in drillstring 16, near drill bit 14 (if LWD tool 22 is used for geosteering, it may be desirable to locate LWD tool 22 as close as possible to drill bit 14). In a steered system, the LWD tool may be placed above mud motor 18, such that LWD tool 22 receives power and returns data to the surface through a wire line cable 24 that is passed down the center of a non-rotating (or slowly rotating) drillstring 16. In a system that uses a rotating drillstring 16 to turn drill bit 14, LWD tool 22 may be placed just above drill bit 14, and a mud pulse data telemetry system (or any other appropriate telemetry method) can be used to return information to the surface. Thus, LWD tool 22 is operatively positioned in borehole 12, typically with an annular space (e.g., filled with drilling mud) between tool 22 and the borehole wall.

LWD tool 22 can incorporate or be associated with one or more directional sensors 26 that provide directional information to the driller to assist in controlling the steering of the drill bit. For example, such directional sensors can be calibrated to indicate the position of the LWD tool 22 relative to an absolute direction, such as the gravity vector or magnetic north.

LWD tool 22 can incorporate one or more formation sensors that are each configured to measure a property of the geologic formation surrounding the borehole. These sensors can detect currents, magnetic fields, radiation, or some other characteristic that can be measured and used to determine information useful to the drilling process. LWD tool 22 can incorporate or be associated with telemetry or other communication equipment to transmit this information to the earth's surface.

As described in more detail below with respect to FIGS. 3A, 3B, and 4, LWD tool 22 can incorporate one or more one or more environmental sensors. Finally, LWD tool 22 can incorporate or be associated with a processing module and one or more storage devices to store measurements obtained using the sensors including the environmental sensors.

Above the earth's surface 30, telemetry receivers and/or other appropriate communication equipment can be located in a logging truck 32 located near drilling rig 10. Thus, communication equipment is positioned to receive and interpret the information generated by LWD tool 22 and sensors including directional sensors 26, so that the information can be collected for later analysis and/or used to steer wellbore 12 into the desired position (e.g., to maximize recovery of hydrocarbons from a selected reservoir).

A data display panel 34 can be provided on or near drilling rig 10 and/or logging truck to give an operator (e.g., a driller, engineer, geologist, or the like) real-time information about the directional progress of wellbore 12 as well as the formation properties of the geologic formation currently near LWD tool 22. In one embodiment, data display panel 34 can be part of a computing device (e.g., data display panel 34 can be rendered on the screen of a laptop computer used by an operator of drilling rig 10).

Figure 2:
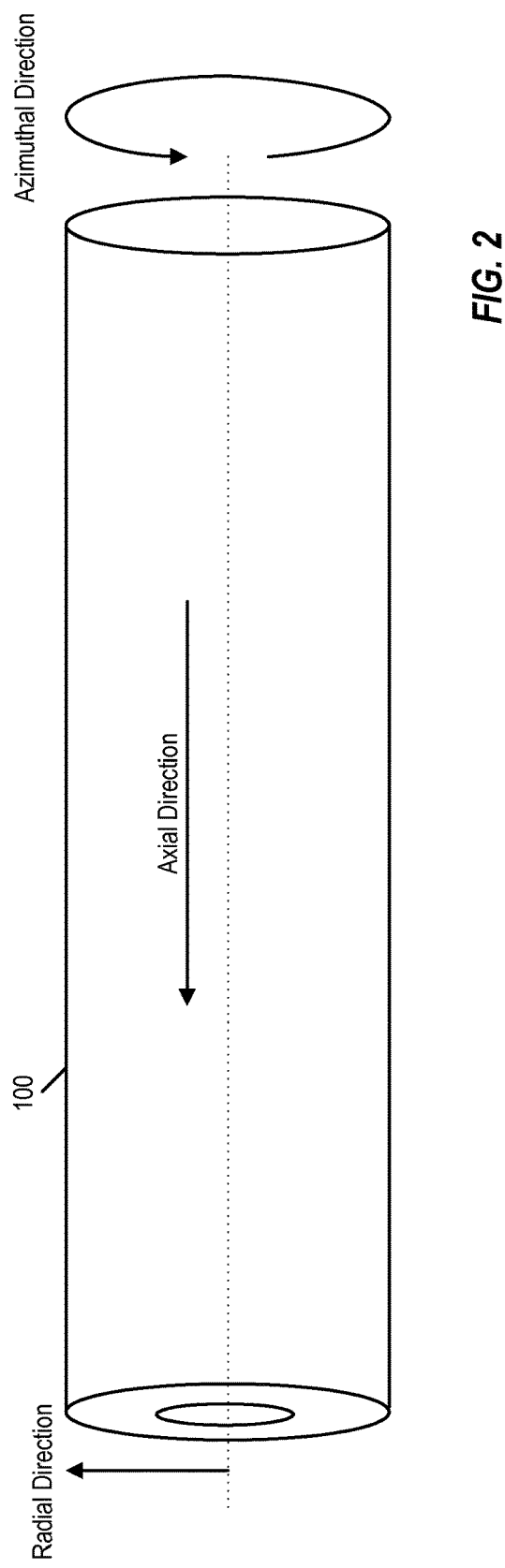
FIG. 2 illustrates a LWD tool in order to show the three basic directional components of mechanical stresses that can be encountered during a drilling operation.

FIG. 2 illustrates a block diagram of a typical LWD tool, such as LWD tool 22 of FIG. 1, and shows how the terms of reference to drilling tools are usually given in cylindrical coordinates. These terms of reference are used throughout this disclosure to describe various mechanical stresses and shocks that a drilling tool can experience. As shown there are three orthogonal directions that can be used to describe shocks: axial, radial, and azimuthal. In FIG. 2, these directions are illustrated. The axial direction runs along the length of the cylinder. The radial direction extends though the center of the cylinder, perpendicular to the axial direction. Finally, the azimuthal direction is a direction in which the cylinder can rotate around its axial axis.

These directions allow different shocks that a cylindrical LWD tool may experience to be described. While the following examples talk about shocks that are primarily defined in one direction only, it is noted that many shocks can include components in multiple directions at once.

Axial shocks originate due to the phenomenon of bit-bounce, which is the tendency of the drill bit to rebound from the rock face during its cutting action. Other sources of axial shocks are mechanisms known as "agitators," which are often used to accelerate drilling by imposing large axial oscillations on the drill bit.

Radial shocks can be caused by the drill collar coming into contact with the borehole wall. Mechanisms known as "exciters" are sometimes used to introduce radial oscillations of the drill collar to encourage the flushing of drill-cuttings.

Finally, high rotational accelerations in the azimuthal direction can be caused by the "stick-slip" motion of modern polycrystalline diamond cutter (PDC) drill bits as they dig into the rock and release when the rock breaks in shear mode.

All of these different types of shocks can lead to malfunction or even failure of the components within or associated with a LWD tool. Such components can include accelerometers and magnetometers (for sensing direction or orientation, such as to identify magnetic North and/or a gravity vector) as well as current, magnetic field, and/or radiation sensors (to determine formation properties). One or more of these components can be combined with electronic circuits (which are also examples of components that can, in some embodiments, be susceptible to malfunction) that can amplify and process electrical signals. Processed data can be transmitted in real-time to the surface (e.g., using a mud-pulse data telemetry system), as well as stored locally within the LWD tool. The processed data can be used to determine the direction in which the drill-bit is headed and the type of rock encountered. The data from the tool can be analyzed by geologists and employed to make informed decisions about how deep to drill a vertical well or for steering the drill-bit in directional-drilling operations.

Radiation sensors are often designed to sense gamma photons emitted by a radioactive source. This is very useful in drilling because it allows the identification of rock types by detecting known naturally-occurring isotopes that emit gamma photons, such as uranium, potassium, and thorium. Detecting particular rock types (based upon the detected isotopes) in turn allows an operator to determine the current location of a drill bit (e.g., by comparing the type of rock the drill bit is currently encountering to geologic survey data) and to adjust the course of drilling if needed.

One type of radiation sensor uses one or more scintillation crystals, which detect gamma radiation by converting incident gamma photons into a brief flash of light. The light signal may then be detected by a photomultiplier that is optically coupled to the crystal, and whose output is an electrical pulse. A typical example is a single crystal or a series of crystals of sodium iodide doped with thallium. An alternative radiation sensor is the proportional (gas-filled tube) type that directly outputs an electrical pulse. Yet another possible alternative is a bulk semiconductor radiation sensor such as a lithium-drifted germanium sensor.

As briefly noted above, sensors like those used to detect orientation and/or radiation are subjected to extreme mechanical shock and vibration during the drilling process. However, typical accelerometers, magnetometers, scintillator crystals, photomultipliers, and the like are inherently rather fragile, even when extreme measures are taken to protect them from mechanical shocks and high temperatures. Furthermore, drilling technology advances, such as fast drilling and under-balanced drilling, have increased the shock levels imposed on the sensors.

Depending upon the implementation of the LWD tool, a single extreme environmental event, such as a high mechanical shock many hundreds of times larger than the force of gravity, may not be sufficient to cause a failure or even a partial failure in a delicate component. However, the accumulation of such stresses may eventually cause failure. For example, certain components, like scintillator crystals, which are exposed to accumulated stresses, especially when combined with exposure to extreme temperature, can experience failures. Similarly, photomultipliers experience a continual reduction in amplification gain at a rate related to temperature. The rate of reduction in gain increases roughly exponentially with increased temperature, so the combination of temperature and time information can be used to predict total degradation.

The potential for sensor components to fail during drilling results in reduced user confidence in the ability of the LWD tool to detect a drilling transition to a contrasting type of rock (e.g., indicating a transition to a different geological formation). In the worst-case example, a scintillator crystal can fracture, or a photomultiplier can suffer broken internal wires. Failures like these can cause changes in the LWD tool output that are indistinguishable from those due to a change in rock properties. In other words, a failure within the LWD tool can lead to a drilling operator erroneously thinking that the drill bit is in a different location than it actually is, potentially leading to the course of drilling being altered erroneously. The potential for such false readings can lower confidence in the LWD tool's output and potentially increase the time needed for drilling by causing operators to spend extra time verifying all of the LWD tool's outputs.

Even when the failure of a LWD tool component does not cause drilling errors, the failure can nevertheless frustrate the course of drilling. In particular, to replace failed components, drilling may need to be stopped while the LWD tool is retrieved from the well, resulting in very expensive down-time of the drilling rig.

In order to reduce potential problems that may occur due to component failure, as well as to provide data that may help prevent or identify component failure, a LWD tool can include one or more dedicated environmental sensors, which are each dedicated to monitoring the environment of a tool component. These dedicated environmental sensors can include accelerometers, temperature sensors, and the like, which are designed to detect environmental conditions, like temperatures and shocks or vibrations, which can potentially lead to component failure.

Figure 3A:
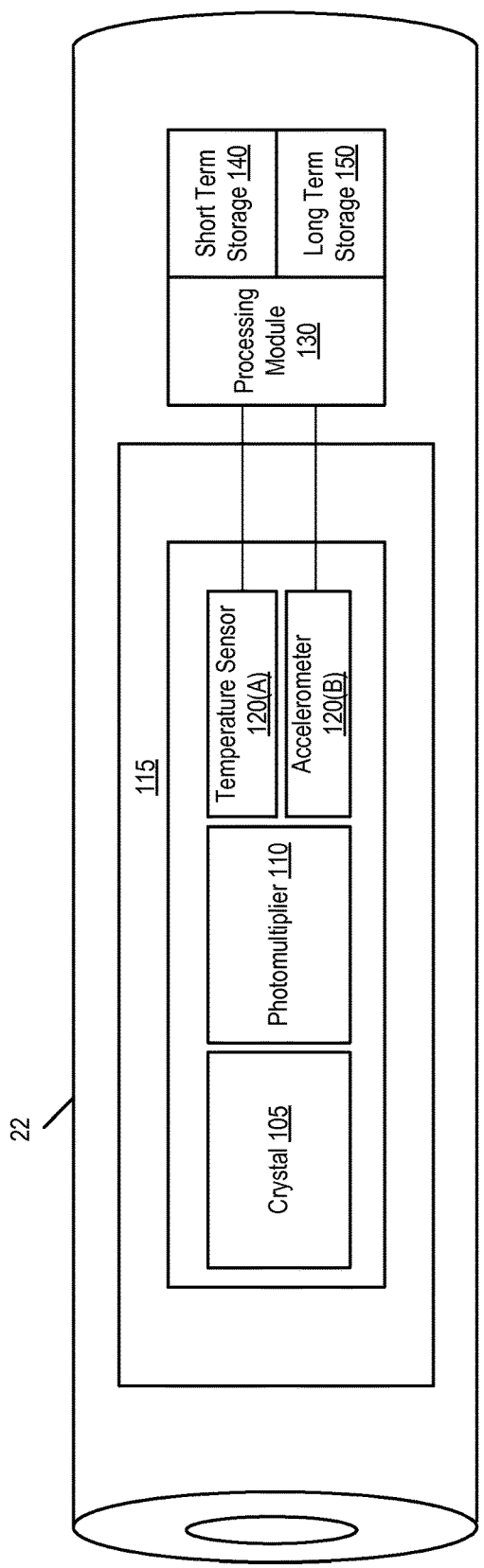
FIG. 3A illustrates a block diagram of a logging tool that includes dedicated environmental sensors, according to one embodiment of the invention.

FIG. 3A shows an example of a LWD tool 22 that includes a variety of dedicated sensors within an enclosed package 115. Here, package 115 includes a formation sensor that includes a scintillator crystal 105 and photomultiplier 110. These components, which allow the tool to act as a radiation sensor, are very fragile. In order to better protect these components, a protective support structure can be included to reduce shocks and/or temperatures experienced by package 115 and components contained therein. In some embodiments, this structure can include rubber springs mounted on a thermally-conductive support structure, as described in U.S. Provisional Patent Application 61/888,899, titled "Shock-Mounted Radiation Sensor With Thermal Isolation," filed Oct. 9, 2013, naming Paul L. Sinclair and Scott Neves as inventors, or U.S. patent application Ser. No. 14/510,677, titled "Shock Mounted Sensor Package With Thermal Isolation," and naming Paul L. Sinclair and Scott Neves as inventors, each of which is hereby incorporated by reference for all purposes as if completely and fully set forth herein.

A pair of dedicated environmental sensors, which includes temperature sensor 120(A) and accelerometer 120(B) (collectively referred to as dedicated environmental sensors 120), is placed within package 115 along with scintillator crystal 105 and photomultiplier 110. These dedicated environmental sensors are placed inside package 115 in order to measure the environmental conditions experienced by the fragile crystal 105 and photomultiplier 110. Mechanical shock that is experienced by crystal 105, photomultiplier 110 and environmental sensors 120 should be less than that experienced by components external to package 115 because of the protective structure mentioned above. Further, the temperature experienced by crystal 105, photomultiplier 110 and environmental sensors 120 may be different than the temperature that is external to package 115. Other environmental conditions within package 115 are contemplated.

In one embodiment, one or both of sensors 120 can be fastened to photomultiplier 115 using a fastener such as a conductive silicone rubber material. Alternatively, sensors 120 can be individually or collectively mounted on a connection board, which in turn is fastened to photomultiplier 115 via a conductive silicone rubber material. Either way, sensors 120 should be proximately located to crystal 105 and photomultiplier 110 to experience substantially the same environmental conditions (e.g., temperature and shock) that are experienced by crystal 105 and photomultiplier 110 during a drilling operation The outputs from the environmental sensors are provided to a processing module 130. Processing module 130 processes the outputs in order to obtain one or more measurements, as described in more detail below, and then stores all or some of the measurements. In this example, processing module 130 stores all or some of the measurements in one or both of the short term storage device 140 and long term storage device 150. The use of these two types of storage devices (which may actually be implemented as partitions of the same storage device) is also explained in more detail below. As shown, in this example, the processing module 130 and storage devices are located external to package 115. In other embodiments, these components can be located inside package 115.

Many LWD tools already include accelerometers and temperature sensors (not shown) that generate signals that is used when producing the output of those LWD tools. Typically, these existing sensors are concerned with the environment experienced by the drill bit or the LWD tool as a whole, and thus these sensors are placed at locations where they can best experience the conditions experienced by the drill bit or the entirety of the LWD tool. For example, temperature sensors may be placed on the outside surface of the tool in order to measure the temperature within the borehole. Similarly, accelerometers may be placed in an undampened portion of the LWD tool in order to fully experience the same shocks and vibrations as the tool itself, while the fragile components within the tool may be located in a portion of the tool that is at least somewhat protected from shocks or high temperatures. Accordingly, environmental sensors external to the protective package 115 are unlikely to accurately measure the environmental conditions being experienced by a fragile component such as crystal 105 and photomultiplier 110. For this reason, the measurements obtained through use of external environmental sensors are unlikely to provide significant relevant data about the environmental conditions being experienced by a fragile component within package 115.

In contrast, by using environmental sensors like those shown in FIG. 3A, which are dedicated to monitoring the specific environment of a particular component (or set of components) within package 115 and which are placed within the same environment as that particular component, data generated through use of the environmental sensors will be much more relevant in determining the actual conditions experienced by that component. At the same time, however, these dedicated environmental sensors will not generate signals related to the actual conditions elsewhere within the borehole. Accordingly, some LWD tools may include several sets of the same types of sensors—some to act as primary measuring devices that measure conditions within the borehole, and others to act as dedicated environmental sensors for a particular LWD tool component. Furthermore, if there are multiple delicate components within a LWD tool, a separate set of environmental sensors may be included to monitor each of the components, especially if the components are located in different sections of the LWD tool. Thus, while FIG. 3A only shows a single set of dedicated environmental sensors 120, other embodiments can include multiple sets of environmental sensors, some of which can be dedicated to component monitoring and others of which can be used to generate the primary output(s) of the LWD tool.

As shown, dedicated environmental sensors 120 can include temperature sensors like temperature sensor 120(A), accelerometers like accelerometer 120(B), and any other sensors needed to monitor the environment in which a sensitive component operates. Other dedicated environmental sensors could detect current and/or voltage, physical contaminants, and so on. In general, the dedicated environmental sensors can include any sensor configured to measure a condition that may lead to reduced performance or failure of a LWD tool component.

Temperature sensor 120(A) is a device that is configured to detect the temperature of the scintillator crystal 105 and photomultiplier 110 or the space immediately adjacent to these components. The output of temperature sensor 120(A) can be a digital value (or set of values) representing temperature in any one or more of a variety of units of temperature (e.g., Kelvin, Fahrenheit, and/or Celsius), or can be an analog value (e.g., a voltage) usable by processing module 130 to obtain such a digital value.

Accelerometer 120(B) is configured to detect shocks and/or vibrations in at least one axis. In many embodiments, the accelerometer can detect shocks and/or vibrations in more than one axis. As an example, in one embodiment the accelerometer can be configured to detect (at least) motion in the axial direction (e.g., along the axis of the tool, as shown in FIG. 2) that results from drill-bit bounce during drilling. This type of shock often leads to scintillator crystal breakage. In recent years, the trend toward faster drilling rates and the use of mechanical agitators downhole has meant that transverse motion (in the axial and/or azimuthal direction) has been the cause of both scintillator crystal and photomultiplier failures. Accordingly, in some embodiments, the accelerometer(s) used as dedicated environmental sensors may be configured to detect shocks and/or vibrations in all three directions. For each monitored direction, the accelerometer generates an output indicating the acceleration being detected in that direction.

As noted above, a protective support structure can be employed to reduce stresses (e.g., shocks) encountered by package 115 and components therein during a drilling operation. FIG. 3B illustrates a sectional block diagram of an example protective support structure 320 and package 115. As shown, package 115 includes the example gamma sensor, which in turn includes photomultiplier 110 and scintillator crystal 105. Sensors 120 are fastened in this embodiment to photomultiplier 110 via a conductive silicone rubber material 121. Photomultiplier 110 and crystal can be coupled together using an optical-coupling material. Crystal 105 generates light signals in response to receiving gamma rays from the surrounding rock formation. Photomultiplier 110 detects the light signal output from scintillator crystal 105. Photomultiplier 110 generates electrical signals in response to the light signals from crystal 105. Sensors 120 are shown fastened to photomultiplier 110 using a conductive silicone rubber material. Support structure 320 and package 115 fit inside a pressure-housing 315 that can withstand the hydrostatic pressure of downhole drilling fluids.

Protective support structure 320 includes annular rubber material springs 225 and supports 330 at each end of package 115. Rubber materials have physical properties that include both spring and damping components. Damping involves energy absorption, which converts mechanical energy into heat. In extended drilling operations with high vibration and shock levels, considerable heat can be generated. This heat can adversely affect package 115. Scintillator crystals exhibit significant reduction in light output with increases in temperature, on the order of −50% for a change of +150 degrees Celsius. Temperature compensation schemes can be provided in associated electronic circuits, but these methods are limited in accuracy, so temperature excursions beyond the ambient levels in a borehole are to be avoided as far as possible. To reduce the ability of the heat generated by the damping process to enter package 115 heat can be dissipated by supports 330. Springs 325 can be molded into, or bonded to, metallic supports 330. The supports can be formed from relatively thermally conductive material, such as aluminum and/or copper. Package 115 is attached to both springs through end connections 340 that may be of metal, such as stainless steel, or high-strength plastic, such as Torlon™ or PEEK™. The end connections 340 can be selected from materials that have a relatively low thermal conductivity so as to reduce the thermal coupling between the springs 325 and package 115.

Figure 3B:
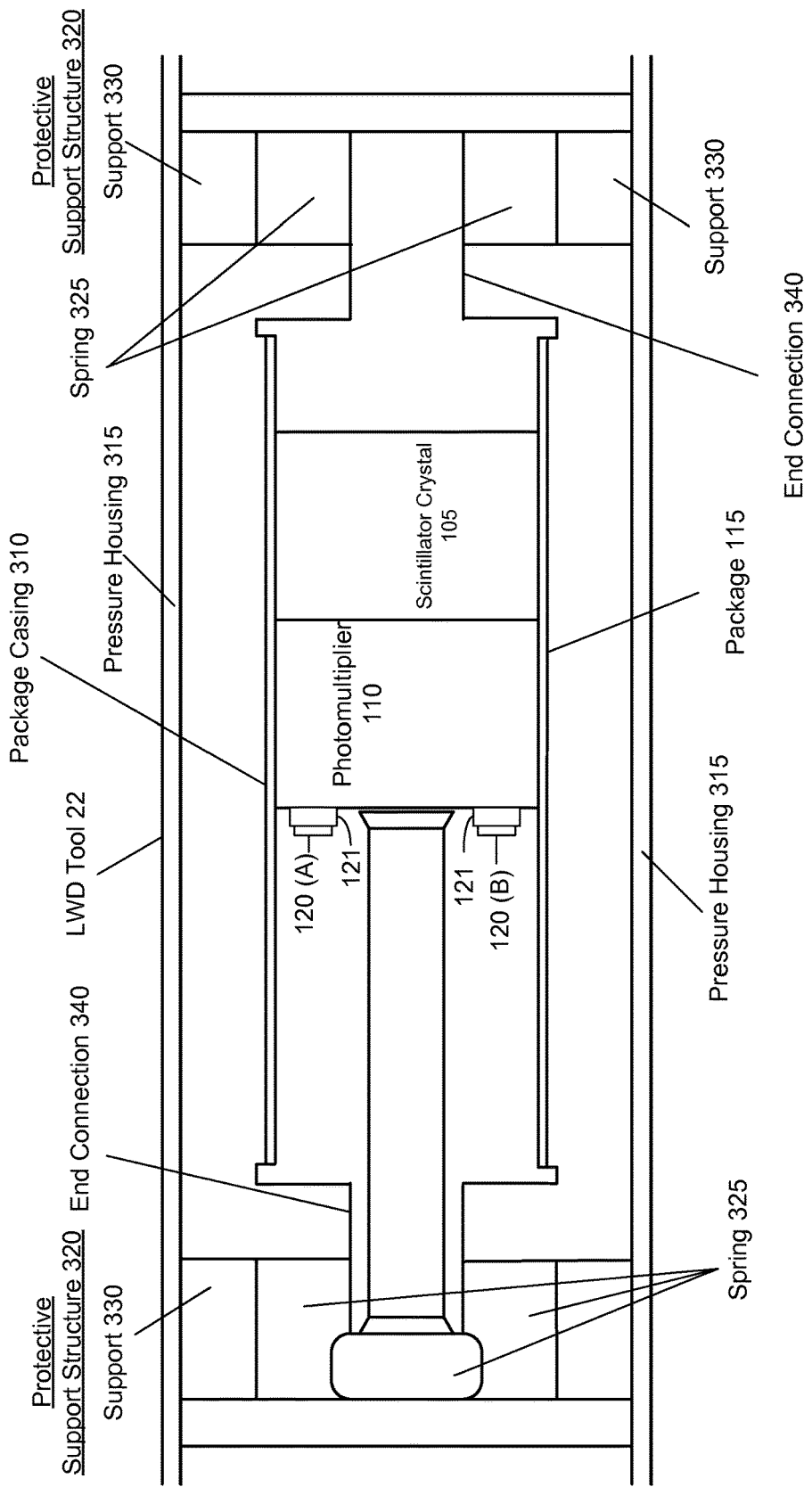
FIG. 3B illustrates an example sensor package that can be employed in the logging tool of FIG. 3A.

It is noted that, as shown in FIG. 3B, package 115 effectively floats within the cavity formed within the annular walls of the pressure housing 315, except for where the springs 325 contact the end connections 340. The space between package 115 and the inside of pressure housing 315 can be filled with air or any other appropriate insulating substance.

The annular shape of the rubber springs 325 is designed to be compliant in all three axes of relative motion: axial, radial, and azimuthal. The specific dimensions of the rubber springs are chosen to provide an appropriate spring-rate in each axis, given the particular dimensions of the LWD tool 22 and package 115 being used. Consideration is also given to the need to limit the maximum deflection of the sprung mass to reduce the likelihood of package 115 colliding with the support structure 320 or pressure housing 315. Here, the non-linear characteristics of the rubber can be employed to advantage along with the shape of the spring to make a spring 325 whose spring-rate increases significantly near the end of the range of travel, thus increasing the likelihood that collisions will be prevented.

The majority of the heat generated in the springs 325 will tend to flow to the outside diameter of the annulus (having the largest surface-area, especially relative to that of the end-connections), where it will be readily dissipated into the outer wall of the pressure housing 315 and the surrounding drilling mud, which can act as a heat-sink. The amount of sprung mass determines the total heat flux that must be dissipated for any given amplitude of mechanical vibration or shock. The amount of sprung mass can be reduced by keeping the size of the package 115 relatively small (in other words, less-fragile components of the LWD tool 22 can be located in areas that are not protected by the springs 325). In this example, the scintillator crystal 105 and associated photomultiplier 110 need to be included in package 115 because both components are relatively fragile and because the two components must be optically coupled to each other. Electrical wires (not shown) can couple the photomultiplier 110 to associated electronic circuits (not shown) that are less fragile and thus do not need to be shock-isolated within package 115. As such, these electronic circuits can be located elsewhere within the LWD tool 22.

The spring components 325 are preferably made of molded-rubber or rubber-like materials as described, but could be alternatively constructed using more conventional metallic coil-springs combined with fluid-filled mechanical dampers, or any other appropriate spring and dampener elements.

Thus, FIG. 3B package 115 is coupled to at least one shock-isolating spring element, and that spring element is thermally coupled to heat-dissipating means (e.g., such as the support 330 and/or pressure housing 315 shown in FIG. 3). A thermally-isolating mechanical coupling (such as the end connections 340 in FIG. 3) can be placed between the package 115 and spring element 325.

As noted in FIG. 3A, LWD tool 22 includes processing module 130. In general, the processing module 130 within a LWD tool can include any module(s) (e.g., analog signal processors, analog-to-digital converters, digital signal processors, accumulators, counters, comparators, and the like) needed to convert the output from a dedicated environmental sensor into a digital measurement, as well as any module(s) needed to store the digital measurements calculated from one or more dedicated environmental sensor outputs. In this example, the processing module 130 monitors the outputs of the dedicated environmental sensors 120 and performs the processing necessary to convert these outputs into one or more values representing a measurement. Processing module 130 then stores the measurements obtained from sensors 120. The intervals at which the processing module 130 can store measurements from dedicated environmental sensors 120 are discussed in more detail below, as are the other types of data that can be stored along with the measurements.

In some embodiments, processing module 130 can also be configured to process the output from the sensor being monitored, which in the example of FIGS. 3A and 3B, is the sensor that includes scintillator crystal 105 and photomultiplier 110. Accordingly, to process the output of the sensor, processing module 130 can accumulate pulses generated by the photomultiplier 110 within the sensor over a fixed time interval (typically one or more seconds) to determine a count-rate number. This count-rate number can be output from the LWD tool to a user in control of the drilling operation. Additionally, in at least some embodiments, the output, such as the count-rate from a sensor, of the component being monitored by the dedicated environmental sensors may be stored along with simultaneously acquired environmental sensor data. This way, a user can correlate and examine the two sets of data side by side in order to see what the environmental conditions were like when each count-rate was measured. Such a comparison allows a user to determine whether changes in the measured count-rate correlate with changes in the environment in which the sensor was operating when those count-rates were detected. Accordingly, the user can use such a comparison to determine whether a change in count-rate indicates a true change in the tool's output—indicating that a new type of rock is being encountered by the drill bit—or is merely an anomaly caused by extreme environmental conditions affecting the sensor.

A LWD tool can include one or more data storage devices (e.g., solid state drives (SSDs), hard drives, optical storage media, and the like) that are configured to store the measurements obtained using the dedicated environmental sensors. The data storage devices can be non-volatile, such that the data storage devices will maintain the stored data even if power to the data storage device is interrupted. As mentioned above, in addition to storing the measurements obtained using the dedicated environmental sensors, the storage devices can store other information, such as information generated using the component being monitored. Additional information that can be stored can also include timestamps, sequence numbers, pointers to other relevant data, and the like. This extra information can be stored with each of the measurements obtained using the dedicated environmental sensors.

Certain types of storage devices, such as certain solid state storage devices, may allow data to only be accessed in terms of memory pages. In embodiments that use these types of storage devices, the processing module 130 can be configured to accumulate (e.g., in a non-volatile buffer) data one page at a time before writing the data to a storage device. Furthermore, the processing module 130 can maintain (e.g., in non-volatile storage) a pointer to the page that was most recently written to and the number of pages that have been written to in total. This allows the processing module 130 to determine which portions of the storage device store valid data. The processing module 130 can be configured to provide this information to a user (or a user's computing device) when the data in the storage device is being copied by the user so that the user can appropriately read that data. It also allows the processing module 130 to treat the storage device as a circular queue, such that the processing module 130 will write to pages, in order, until all of the available pages have been written to. At that point, if the LWD tool 22 is still operating, the processing module 130 can begin writing new data over the oldest data in the storage device.

In this example, the LWD tool 22 actually maintains two sets of measurements, which are referred to herein as "long term" and "short term" measurements. The short term measurements are stored in short term storage 140, and the long term measurements are stored in long term storage 150. Here, short term storage 140 and long term storage 150 can be maintained as separate partitions of a solid state drive (or a virtual device formed from a set of such solid state drives), or in separate solid state drives (or separate sets of solid state drives).

The short term measurements are recorded at the same intervals as the LWD tool's and/or an output generated using the component being monitored. Thus, in the example of FIG. 3, if the sensor generates a count-rate every 5 seconds, the short term data will be recorded at corresponding 5 second intervals. In other words, at each point in time that a count rate is generated, a corresponding set of one or more measurements from the dedicated environmental sensors will be generated. This way, the short term measurements can be correlated with the LWD tool's output for verification purposes. This can even allow a user to plot a graph showing the environmental conditions measured by the dedicated environmental sensors against the output obtained using the monitored component. Accordingly, processing module 130 can be configured to generate measurements at the appropriate intervals using the outputs of the dedicated environmental sensors and to store these measurements in a manner that they can be correlated with the associated output(s) generated using the components being monitored.

As noted above, a variety of different environmental conditions can affect the operation and/or integrity of components within an LWD tool. In many cases, these different types of conditions can combine in ways that one condition exacerbates a detrimental effect caused by another condition. Thus, a scintillator crystal may be more likely to fracture when exposed to a series of shocks while also experiencing relatively high temperatures than it would if exposed to that same series of shocks at a lower temperature. For this reason, processing module 130 can be configured to record a variety of different measurements, each of which can be obtained from a different dedicated environmental sensor, at each time interval. Other information, obtained from sources other than dedicated environmental sensors, may also be recorded alongside these measurements.

In one embodiment, the processing module 130 can cause the following types of information to be stored in short term storage 140 one during each short term interval: elapsed time since the LWD tool 22 was powered up; maximum gamma count per second (e.g., based upon a one minute average of gamma counts per second during the most recent minute); average gamma count per second (e.g., based upon a 15 second average of gamma counts per second during the most recent 15 seconds); minimum battery voltage (e.g., the lowest battery voltage for the LWD tool 22 during the most recent minute); the LWD tool 22 current (e.g., the maximum value of the current during the most recent minute); the maximum acceleration in the axial direction (e.g., during the most recent minute); the maximum acceleration in the azimuthal direction (e.g., during the most recent minute); and a flag indicating whether the mud flow and/or tool power was on or off at the time of the measurement. Other information can be included instead of and /or in addition to this information in other embodiments.

In some embodiments, the size of the storage device allocated to storing short term measurements can be selected so that the LWD tool can store short term measurements for the entirety of a typical drilling operation (e.g., in one embodiment, the short term storage 140 is configured to store 750 hours worth of dedicated environmental sensor measurements and associated data).

The long term data storage can record measurements at greater intervals than the short term data storage. For example, processing module 130 can add a set of long term measurements to long term storage 150 once each hour that the LWD tool 22 is in operation. The long term data storage is designed to record measurements over an extended period of operation of the tool, in order to show the types of conditions the tool component has been exposed to throughout that period. Thus, the long term data storage can include measurements taken by the dedicated environmental sensors over the course of multiple drilling operations. In some embodiments, the long term data storage is designed to record measurements for at least as long as the manufacturer's warranty period for the tool. In other embodiments, the long term data storage is designed to record measurements over the entire lifetime of the tool (e.g., the long term data storage can be configured to store 10 years worth of data).

Long term storage 150 may, in some embodiments, be protected against erasure. For example, the manufacturer of the LWD tool may use the data in long term storage 150 when evaluating warranty claims for the LWD tool. Accordingly, it is important that the data in long term storage 150 be protected against accidental erasures or tampering so that the manufacturer can trust the information stored in long term storage 150. Thus, once data is written by processing module 130 to long term storage 150, that data may become read-only. In contrast, short term storage 140 may not be protected in this manner, allowing a user to erase the data in short term storage at the user's discretion. For example, after all of the short term data for a particular drilling operation has been copied off of the LWD tool 22, the user can erase short term storage 140, freeing this space to store data for the next drilling operation in which the LWD tool is used.

In some embodiments, additional read-only information can be included in long term storage 150 (or in another storage device and/or storage partition). For example, when the LWD tool 22 is originally manufactured (or when refurbished by the manufacturer), the manufacturer can store calibration data indicating how and/or when the LWD tool 22 was calibrated, the serial numbers of various components included within the LWD tool 22, the repair history 22 of the LWD tool 22, a serial number or other identifier used to distinguish the LWD tool 22 from other LWD tools (e.g., if the owner has several of the same type of tool, and wants to be able to identify each uniquely within inventory), and other information of value to the manufacturer, owner, and/or operator of the LWD tool 22.

Since the long term data is condensed (or compressed over time) with respect to the short term data, a variety of choices can be made when selecting which particular measurement(s) to record for each long term data interval. For example, for some measurements, such as temperature, it may be desirable to record the highest and lowest temperature detected during the interval. For other measurements, it may be desirable to record the average and/or the mean of the short term interval measurements that were captured during the long term interval. For example, if the short term interval is five (5) seconds and the long term interval is one (1) hour, the measurement for the long term interval can be the average of all of the values captured at five second intervals during the one hour interval. In general, the measurement(s) recorded for each long term interval can be generated as any function of the measurements obtained by the dedicated environmental sensors.

In one embodiment, the processing module 130 stores the following information in long term storage 150: the total amount of time that the LWD tool has been in operation (i.e., its lifetime hours of operation); the maximum gamma count taken in the last (most recent) hour from the monitored sensor; the minimum gamma count taken in the last hour from the monitored sensor; the average LWD tool battery voltage for the last hour; the maximum percentage change in battery voltage over the last hour; the maximum LWD tool current in the last hour; the maximum temperature detected in the last hour; the maximum axial acceleration measured in the last hour; the maximum azimuthal acceleration measured in the last hour; the total minutes of mud flow time the LWD tool 22 has been exposed to during its lifetime; the phototube voltage of the photomultiplier during the past hour; and the variation in phototube voltage during the past hour. Other embodiments can include other information instead of and/or in addition to that described in this example.

If multiple components within the LWD tool 22 are each being monitored by a different set of one or more dedicated environmental sensors, the measurements (both short term and long term) for each set of sensors can be recorded in a way that they can be differentiated from the measurements obtained by other dedicated environmental sensors that are monitoring a different component. For example, in one embodiment, a different data storage device can be associated with each monitored component, and the measurements captured by each set of dedicated environmental sensors can be recorded in the appropriate data storage device. In other embodiments, data from all of the dedicated environmental sensors, regardless of which component they are monitoring, is stored in the same data storage device. In these embodiments, each measurement can be associated with an identifier, indicating which component that measurement corresponds to.

In addition to storing measurements, the LWD tool 22 can be configured to communicate at least some of the measurements obtained by the dedicated environmental sensors to the surface in real time during drilling. This way, a drilling operator can look at the measurements obtained by the dedicated environmental sensors when verifying the output of the LWD tool 22. If the dedicated environmental sensors measured conditions that are likely to cause breakage or malfunction of the monitored component, the drilling operator will interpret the output of the LWD tool 22 in light of those conditions. For example, the LWD tool's output can undergo a change (e.g., indicating a possible change in geologic formation). If the dedicated environmental sensors measured that a delicate component within the LWD tool 22 just experienced a shock that exceeded its design parameters, the drilling operator can decide that the tool may be malfunctioning and disregard the measurement. The drilling operator can also decide to halt drilling in order to retrieve the tool for repair and/or replacement if needed. On the other hand, if the dedicated environmental sensors indicate that the tool is still operating within ideal conditions (and no prior excessive conditions were detected), the drilling operator can determine that the tool is still operating properly and that the tool's output is valid.

In many situations, the only way for the LWD tool 22 to communicate data to the surface may be via a relatively bandwidth-limited communication means, such as mud-pulse telemetry. In these situations, the LWD tool 22 may use the bulk of the available bandwidth to transmit its output (e.g., derived from the output of the gamma detector in this example) to the surface. As such, there may not be enough remaining bandwidth to transmit all of the short and/or long term data to the surface. Here, in order to conserve bandwidth, the LWD tool 22 can be configured to only transmit a very limited set of measurements from the dedicated environmental sensors to the surface. Alternatively, the processing module 130 can compare the measurements from the dedicated environmental sensors to appropriate threshold values (e.g., indicating extreme conditions that may cause component failure, malfunction, or reduced performance). If a measurement exceeds a corresponding threshold, processing module 130 can cause the LWD tool 22 to transmit an alarm or error signal to the surface, indicating that a component within the tool may be experiencing problems. In embodiments in which alarms, but not measurement data, are transmitted, a drilling operator can determine whether the tool is operating properly based on the presence or absence of an alarm signal.

As noted above, the measurements obtained using the dedicated environmental sensors can be stored internally within the LWD tool 22. The LWD tool 22 can also allow a user to copy (e.g., via a cabled connection, via a wireless network, or the like) the recorded measurements from the LWD tool to another computing and/or storage device. For example, the LWD tool 22 can include an interface (not shown) that allows a user to connect a cable between the LWD tool and a computing device (e.g., a laptop computer, desktop computer, personal electronic device such as a smart phone or tablet, or the like) in order to copy the recorded measurements from the LWD tool 22 to the computing device. Downloading the data from storage devices 140 and 150 to computer software allows the history of the tool environment to be analyzed and preventive maintenance performed.

As described above, the two types of storage serve two different purposes. The short term storage 140 stores data that is usable to analyze the tool output generated using the monitored component in light of the environmental conditions that affected the monitored component. This information tends to be of most use to a user in order to analyze what happened during a drilling operation.

In contrast, long term storage 150 stores data that is usable to determine the conditions that the monitored component has been exposed to over the lifetime of the tool. The data in long term storage 150 can be used by the user and/or manufacturer for a variety of different purposes. For example, a manufacturer can archive data from many different tools and then data mine this data (e.g., to see how effective protective material 150 is, to determine which types or batches of monitored components are most robust, to see what types of conditions customers tend to be using the tools in, and the like). A manufacturer can also used this information in long term to resolve warranty disputes. For example, if the manufacturer only guarantees proper operation under certain conditions, and if the information in long term storage 150 indicates that the LWD tool 22 was operated outside of those conditions, the manufacturer can determine that any failures are the financial responsibility of the user, not the manufacturer.

The data in long term storage 150 can also be used by the customer. For example, looking at the data, the customer may determine that it is time to perform preventative maintenance on the LWD tool 22 in order to avoid potential malfunction of the monitored component the next time the LWD tool 22 is used. A manufacturer may even provided software that analyzes the long term data for a customer (e.g., based on algorithms determined from data mining a set of long term data gathered by a large set of LWD tools) and notifies the customer whenever preventative maintenance is recommended for a LWD tool.

Figure 4:
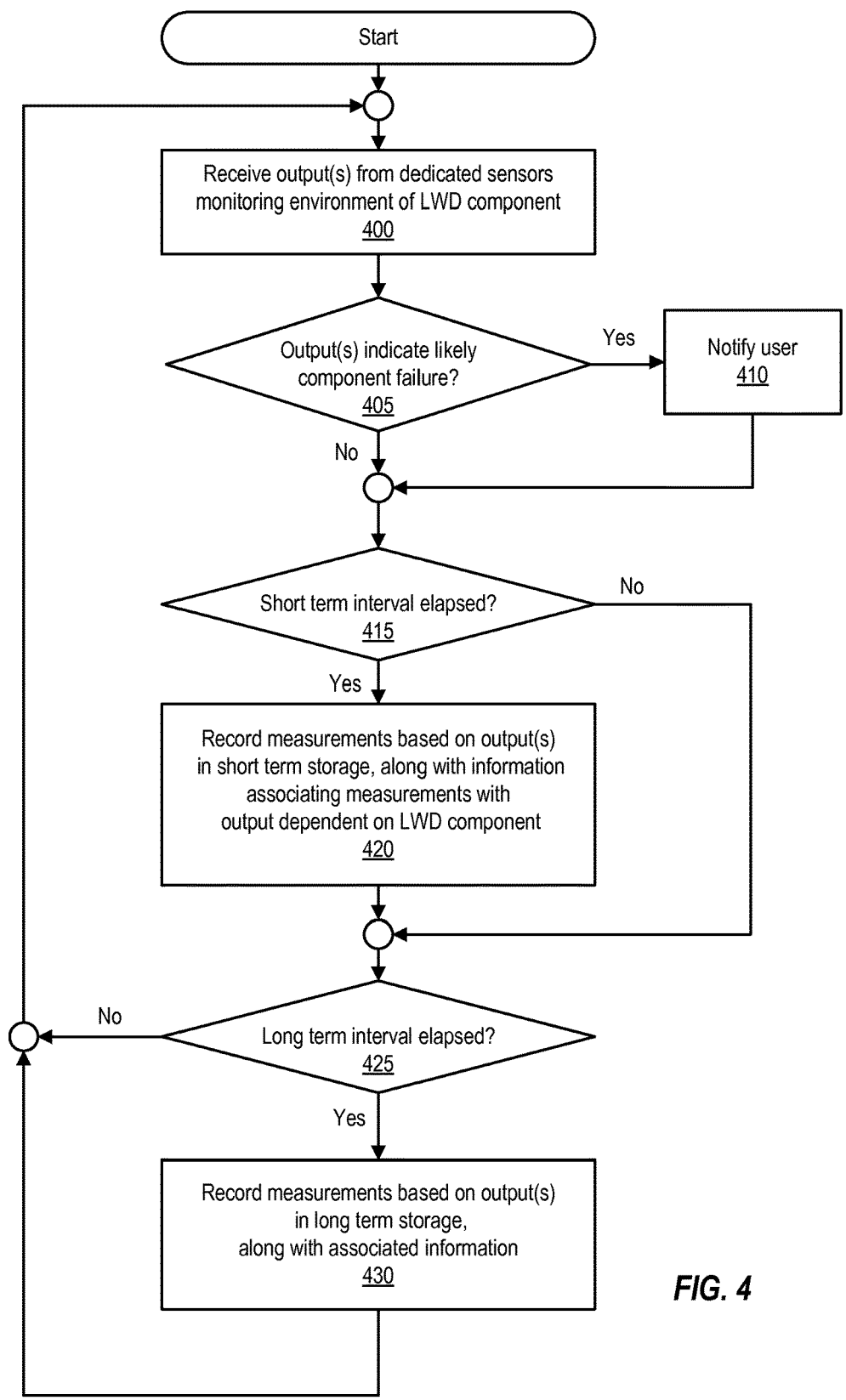
FIG. 4 is a flowchart of a method of operating a LWD tool that includes dedicated environmental sensors, according to one embodiment of the present invention.

FIG. 4 illustrates a flowchart of a method of operating a LWD tool that includes dedicated environmental sensors that monitor a LWD tool component. This method can be performed by a processing module like processing module 130 of FIG. 3. The method begins with operation 400, where one or more outputs from one or more dedicated environmental sensors are received. Operation 400 can be performed continuously throughout the performance of the illustrated method.

In this example, the method is designed to generate an alarm signal (e.g., to be transmitted to the surface via mud pulse telemetry) whenever a potential failure is detected. At 405, a determination is made as to whether the outputs indicate that a potential failure has occurred. This can be done by comparing one or more of the outputs to a threshold value. A combination of values (current and/or historical) may be considered. For example, if an accelerometer detects a large shock, and if historical data indicates that several other large shocks have already occurred, the determination may be that a potential failure has occurred. Similarly, if a large shock is detected at the same time as an extreme temperature, a potential failure can be determined to have occurred. If the determination at 405 indicates that a potential failure has occurred, a user notification is generated and transmitted to the user, as shown at 410.

At 415, a determination is made as to whether the short term interval (i.e., the interval of time at which measurements are stored into the short term storage device) has elapsed. If so, as shown at 420, one or more measurements obtained using the dedicated environmental sensor(s) are recorded in the short term storage device. Information associating these measurements with an output obtained using the component being monitored is also recorded. This information could be a timestamp, sequence number, pointer, or even the output obtained using the component being monitored itself. Additional information about the current (or recent) state of the LWD tool can also be recorded, as described above.

At 425, a determination is made as to whether the long term interval (i.e., the interval of time at which measurements are stored into the long term storage device) has elapsed. If so, one or more measurements obtained using the dedicated environmental sensor(s) is recorded in the long term storage, as shown at 430. Additional information about the state of the LWD tool during the most recent long term interval can also be recorded with the measurements, as described above.

It is noted that, for ease of explanation, the flowchart of FIG. 4 shows certain determinations being made in series. However, in actual operation, all of these determinations may be made in parallel (e.g., operations 405, 415, and 425 can be performed largely in parallel).

While the above description has provided examples in which data is stored periodically, other embodiments are possible. For example, in some embodiments, instead of and/or in addition to storing data periodically, the LWD tool may add data to one or both of short and long term storage in response to other conditions, such as the detection of certain non-periodic events or triggers.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A logging-while-drilling (LWD) system comprising:
a formation sensor configured to generate a signal related to a property of a surrounding rock formation;
a first accelerometer fastened to the formation sensor and configured to generate a signal related to vibration or shock experienced by the formation sensor;
a first temperature sensor fastened to the formation sensor and configured to generate a signal related to temperature experienced by the formation sensor;
a processor, wherein the processor is configured to generate rock formation measurements as a function of signals generated by the formation sensor, wherein the processor is configured to generate shock or vibration measurements as a function of signals generated by said first accelerometer, and wherein the processor is configured to generate temperature measurements as a function of signals generated by said first temperature;
a memory configured to store the rock formation measurements, the shock or vibration measurements, and the temperature measurements.

2. The LWD system of claim 1 further comprising:
a housing;
a package contained within the housing;
a protective support structure contained within the housing and coupled to the package;
wherein the protective support structure is configured to reduce shock or vibration experienced by the formation sensor and the first accelerometer.

3. The LWD system of claim 1 wherein the memory comprises:
a first memory and a second memory;
wherein the processor is configured to store contemporaneously generated rock formation measurements and shock or vibration measurements in the first memory;
wherein the processor is configured to store some but not all of the contemporaneously generated rock formation measurements and shock or vibration measurements in the second memory.

4. The LWD system of claim 1 wherein the processor is configured to generate a warning signal when one or more of the shock or vibration measurements exceed a predetermined threshold.

5. A logging-while-drilling (LWD) system comprising:
a housing;
an enclosed package contained in the housing;
a formation sensor contained within the enclosed package, wherein the formation sensor is configured to generate a formation signal related to a property of a rock formation external to the housing when the housing is within in a borehole;
a first accelerometer contained within the enclosed package, wherein the first first accelerometer is configured to generate a first signal related to shock or vibration within the enclosed package;
a second accelerometer external to the enclosed package, wherein the second accelerometer is configured to generate a second signal related to shock or vibration external to the enclosed package;
a first temperature sensor contained within the enclosed package, wherein the first temperature sensor is configured to generate a signal related to temperature within the enclosed package.

6. The LWD system of claim 5 wherein the first accelerometer is fastened to the formation sensor using a silicon material so that the first accelerometer and the first formation sensor experience substantially the same environmental conditions.

7. The LWD system of claim 5 further comprising:
a processor;
a memory;
wherein the processor is configured to generate first shock or vibration measurements as a function of first signals generated by the first accelerometer;
wherein the processor is configured to generate formation measurements as a function of formation signals generated by the formation sensor;
wherein the processor is configured to store contemporaneously generated rock formation measurements and first shock or vibration measurements in the memory;
wherein the processor and memory are contained in the housing.

8. The LWD system of claim 7 wherein the processor is configured to generate information related to contemporaneously generated rock formation measurements and first shock or vibration measurements, wherein the processor is configured to store the information in the memory, wherein the information comprises time stamps.

9. The LWD system of claim 5 further comprising:
a shock absorber contained within the housing and operably coupled to the enclosed package;
a thermally conductive structure contained within the housing and operably coupled to the shock absorber and the housing.

10. The LWD system of claim 9:
wherein the shock absorber is configured to reduce mechanical shock experienced by the first accelerometer and the formation sensor;
wherein the thermally conductive structure is configured to conduct heat generated by the shock absorber.

11. A method comprising:
a formation sensor generating a signal that relates to a property of a surrounding rock formation while the formation sensor is contained in a borehole;
a first accelerometer generating signals related to shock or vibration experienced by the first accelerometer, wherein the first accelerometer is proximately located to the formation sensor so that the first accelerometer and the formation sensor experience substantially the same environmental conditions;
a second accelerometer generating signals related to shock or vibration, which is different from the shock or vibration that is experienced by the first accelerometer;
a first temperature sensor generating signals related to temperature experienced by the first temperature sensor;
a circuit generating rock formation measurements as a function of the signals generated by the formation sensor;
the circuit generating first shock or vibration measurements as a function of the signals generated by said first accelerometer;
the circuit generating temperature measurements as a function of the signals by the first temperature sensor;

the circuit storing the rock formation measurements and the first shock or vibration measurements in memory.

12. The method of claim 11 further comprising:
the circuit storing contemporaneously generated first shock or vibration measurements and rock formation measurements in a first memory;
the circuit storing some but not all of the contemporaneously generated first shock or vibration measurements and rock formation measurements in a second memory.

13. The method of claim 12 further comprising the circuit generating information related to the contemporaneously generated rock formation measurements and first shock or vibration measurements, wherein the processor is configured to store the information in the memory, wherein the information comprises time stamps.

14. The method of claim 11 wherein the first accelerometer and the rock formation sensor are contained in an enclosed package, which in turn is contained in a housing of a logging while drilling (LWD) tool, and wherein the second accelerometer is external to the enclosed package.

15. The method of claim 11 further comprising:
the circuit storing contemporaneously generating first shock or vibration measurements, second shock or vibration measurements as a function of the signals generated by said second accelerometer, and rock formation measurements in a first memory;
the circuit storing some but not all of the contemporaneously generated first shock or vibration measurements, second shock or vibration measurements, and rock formation measurements in a second memory.

16. The LWD system of claim 1 wherein the formation sensor and first accelerometer are fastened together using a conductive silicon material.

* * * * *